J. J. McNALLY.
PNEUMATIC COTTON GIN.
APPLICATION FILED JAN. 4, 1909.
1,033,718.
Patented July 23, 1912.
3 SHEETS—SHEET 1.
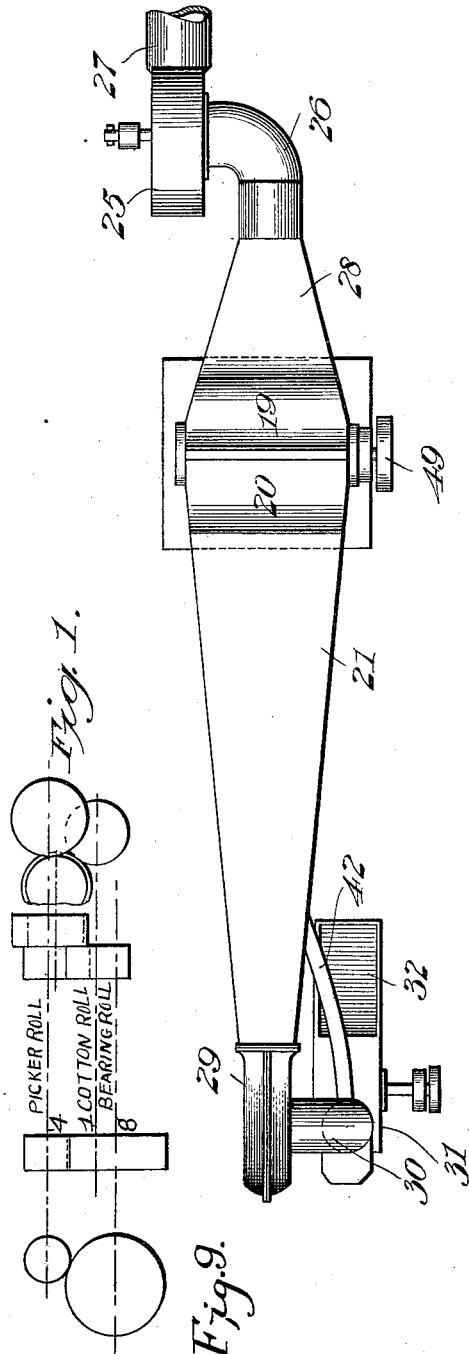
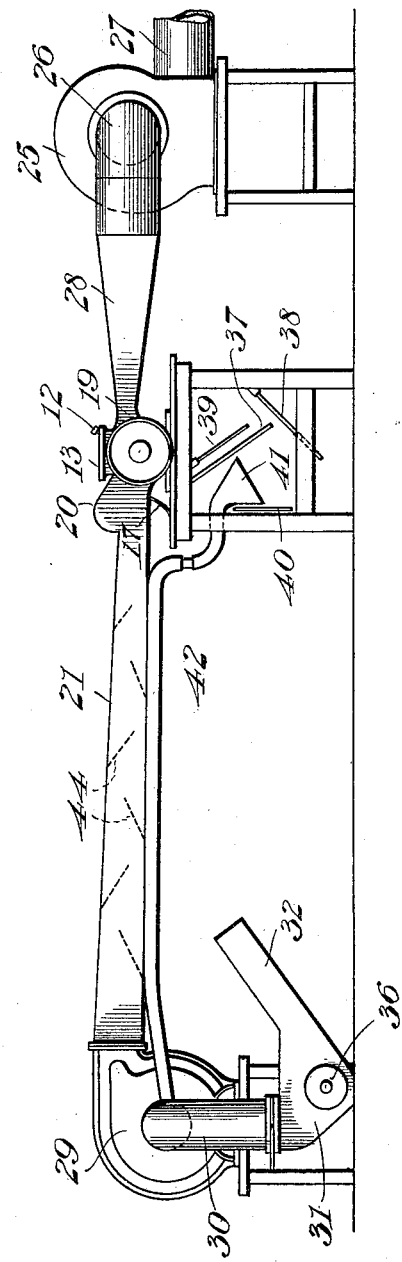
Witnesses
T. L. Mockson
Robert N. Jones.
Inventor
John J. McNally
By Rexford M. Smith.
Attorney

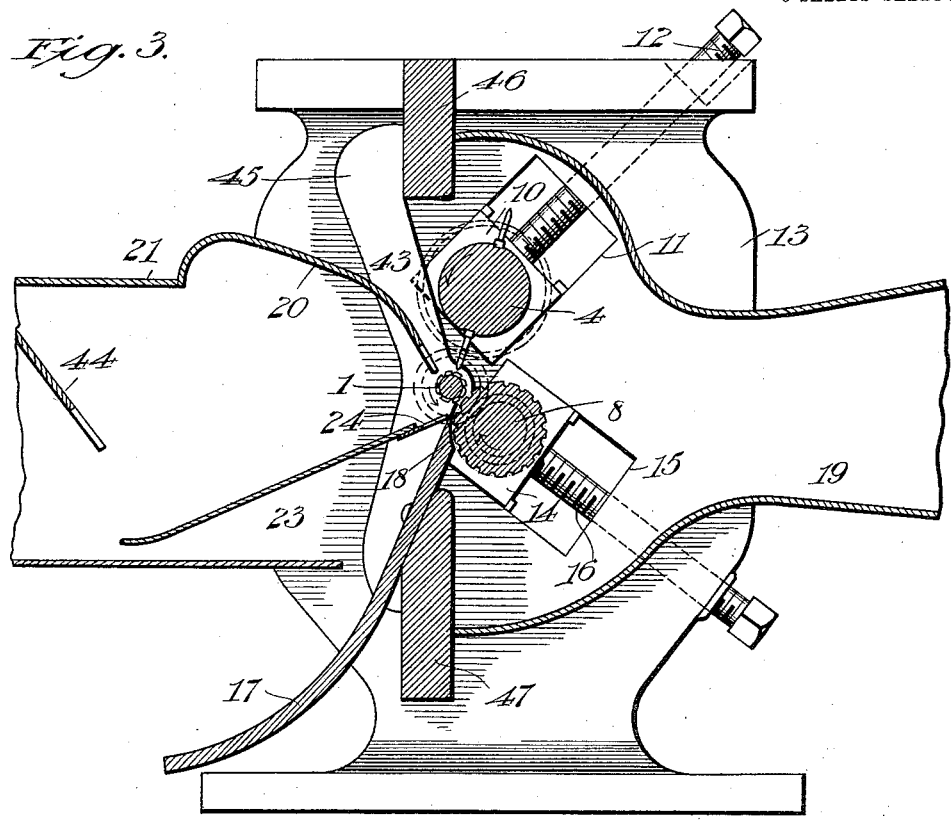
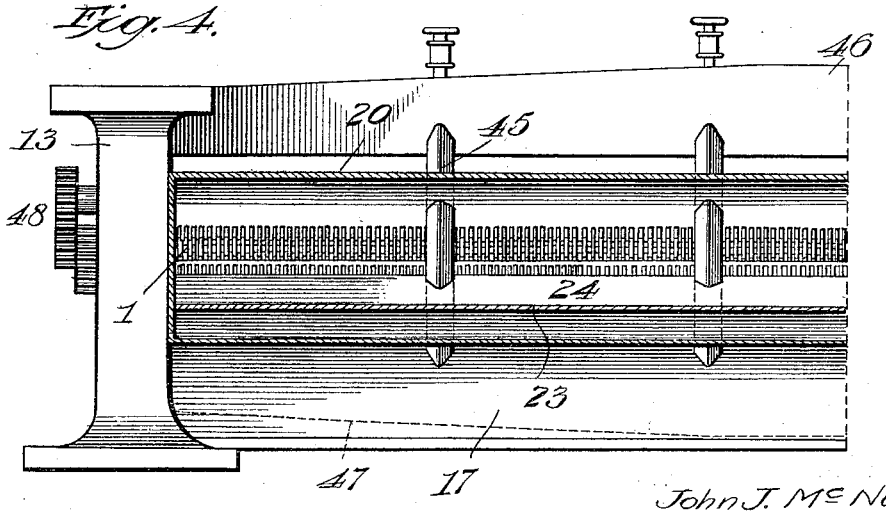

J. J. McNALLY.
PNEUMATIC COTTON GIN.
APPLICATION FILED JAN. 4, 1909.

1,033,718.

Patented July 23, 1912.

3 SHEETS—SHEET 3.

Witnesses
F. L. Mackason
Robert N. Jones.

Inventor
John J. McNally
By Reyford M. Smith
Attorney

UNITED STATES PATENT OFFICE.

JOHN J. McNALLY, OF NORFOLK, VIRGINIA, ASSIGNOR TO McNALLY PNEUMATIC GIN CORPORATION, A CORPORATION OF VIRGINIA.

PNEUMATIC COTTON-GIN.

1,033,718.  Specification of Letters Patent.  Patented July 23, 1912.

Application filed January 4, 1909. Serial No. 470,674.

*To all whom it may concern:*

Be it known that I, JOHN J. McNALLY, a citizen of the United States, residing at Norfolk, in the county of Norfolk and State of Virginia, have invented a certain new and useful Pneumatic Cotton-Gin, of which the following is a specification, reference being had therein to the accompanying drawing.

This invention relates to pneumatic cotton gins or separators, the object of the invention being to provide simple and effective mechanism for separating the entire cotton or fiber from the seed or bolls, the separation being effected through the instrumentality of rolls having a certain relation to each other and also through the instrumentality of a current of air by means of which the seed cotton after being disintegrated is subjected to the action of the rolls which operate to strip the cotton fiber from the seeds or bolls, producing a long fiber staple of exceptionally great value and commercial utility.

With the above and other objects in view, the nature of which will more readily appear as the description proceeds, the invention consists in the novel construction, combination and arrangement of parts as herein fully described, illustrated and claimed.

Figure 5:
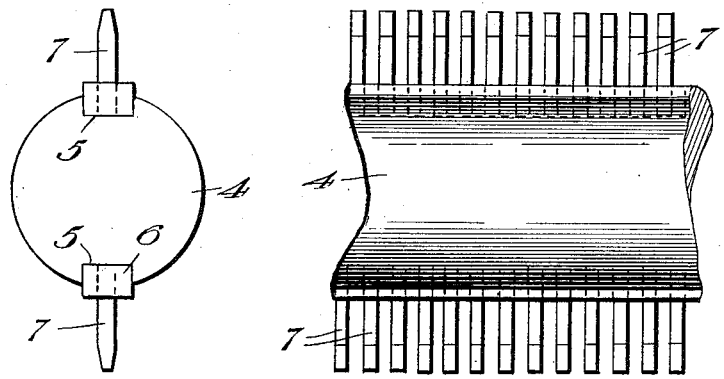
Figure 6:
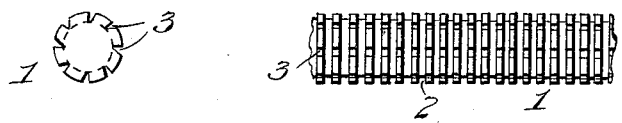
Figure 7:
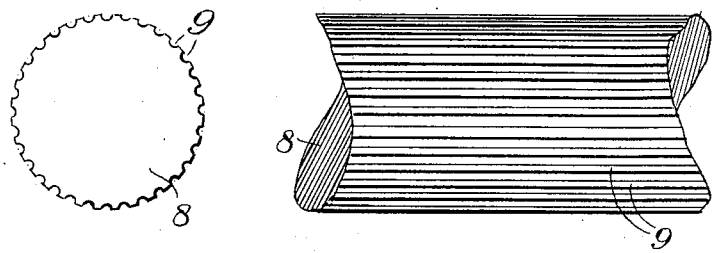
Figure 8:
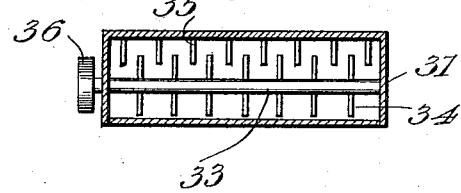

In the accompanying drawings:—Figure 1 is a plan view of the entire machine or apparatus. Fig. 2 is a side elevation of the same. Fig. 3 is an enlarged longitudinal section through the central portion of the machine, showing the rolls which operate on the cotton. Fig. 4 is a vertical transverse section taken just in front of the rolls. Fig. 5 is a detail view, showing the picker roll in end and side elevations. Fig. 6 is a similar view of the cotton rolls. Fig. 7 is a similar view of the bearing rolls. Fig. 8 is a detail vertical section through the disintegrator. Fig. 9 is a diagrammatic view of the gearing for driving the picker roll, bearing roll and feed roller.

Referring to the drawings, 1 designates the cotton roll which is sufficiently small to allow the strands of cotton to wrap around the same, said roll varying in diameter in a full size machine from one-half inch to eleven-sixteenths of an inch, the latter size being better adapted for long staple cotton such as Peruvian cotton while the smaller size is adapted for shorter staple or upland cotton. However, the size of the cotton roll may be varied to suit conditions and different kinds of cotton and other fiber without departing from the principle of this invention. The roll 1 which is shown in detail in Fig. 6 is circumferentially grooved as shown at 2 and is also formed with V-shaped longitudinal grooves as shown at 3 thus giving to said roll a roughened surface or a surface made up of an infinitesimal number of small points or teeth having undercut faces which are adapted to engage the cotton and cause the cotton to wrap itself around the roll within the grooves and between the ridges, the cotton eventually covering the roll and the teeth.

Above the cotton roll and just a little back of the vertical planes of the cotton roll is arranged a relatively larger picker roll 4 which is shown in detail in Fig. 5. This roll is provided with diametrically opposite grooves or seats 5 in which are arranged tooth-holding bars or strips 6 each provided with a longitudinal series of dull pointed picker teeth 7. These teeth project radially from the roll and by reference to the right hand portion of Fig. 5, it will be observed that the teeth at one side of the roll are staggered with relation to the teeth at the other side of the roll and by making said teeth of the proper width and regulating the space between the teeth, the entire surface of the cotton roll and the fiber contained therein is acted upon by the picker teeth. The teeth approach very closely to the cotton roll, in a full size machine, to about 6/1000 of an inch.

Beneath the plane of the cotton roll and a little to the rear of the vertical plane thereof is the bearing roll 8 which is also of considerably larger size than the cotton roll as shown in Fig. 3, said bearing roll being illustrated in detail in Fig. 7 wherein it is seen to be longtudinally fluted or corrugated; in other words, the working surface of the bearing roll is provided with grooves 9 extending lengthwise thereof, said grooves being substantially semi-cylindrical in cross section thereby forming comparatively sharp corners at opposite sides of the ridges formed by the grooves. It is desirable to make the bearing roll 7 as small as convenient for the reason that the smaller the bearing roll, the smaller the separating throat between the rolls and the closer the seed may be drawn between the contact points of the rolls without being pulled in between them. As a result of such arrangement, the seed will be much cleaner and more fiber will be obtained. The bearing roll 8 and the cotton roll 1 should be as near together as possible without touching, the bearing roll forming a bearing surface for the cotton on the cotton roll and the cotton passing between the rolls, the distance between the rolls 1 and 8 being gaged ordinarily by strips of newspaper placed between them.

The cotton roll 1 runs in fixed bearings but the picker roll 4 and the bearing roll 8 are adjustable relatively to the cotton roll as seen in Fig. 3 in which it will be observed that the picker roll is mounted in sliding boxes 10 movable outward and inward in guide-ways 11 formed in the end frame pieces or heads 13 of the casing, the inward movement of said sliding boxes being effected by adjusting screws 12. In like manner the journals of the bearing roll 8 are mounted in sliding boxes 14 movable in guide-ways 15 in the end frame pieces 13 and regulated by means of adjusting screws 16. In this way a fine and accurate adjustment may be obtained between the picker roll and the cotton roll and between the bearing roll and the cotton roll.

17 designates the lower guard plate which is preferably curved as shown in Fig. 3 and has its upper edge set very close up to the cotton roll and bearing roll, said guard plate being shown as concaved, at 18, to partially embrace and cover the front portion of the bearing roll up as high as the cotton roll. The function of the lower guard plate 17 is to prevent the seed from being drawn into the suction chamber 19 along with the cotton.

The upper guard plate 20 inclines downward from the top wall of the feed chute 21 and the lower rear edge thereof is arranged within about one-eighth of an inch of the cotton roll 1 or sufficiently close thereto to prevent the seed cotton from being drawn into the suction chamber 19. The upper guard plate is also arranged at such an angle as to prevent the seed cotton from blowing back within the blast chamber 20 formed by the feed chute 21.

23 designates the cotton plate or apron which inclines upwardly from near the bottom wall of the feed chute and blast chamber toward the cotton roll, that edge which goes next to the cotton roll, being provided with points or teeth 24 which are ordinarily about two inches in length and about one-half an inch apart to allow the seed to fall between the same, the teeth being sufficiently close to prevent the seed cotton from blowing down.

The feed chute 21 in a full size machine is ordinarily about ten feet in length and by reference to Figs. 1 and 2 it will be observed that while the feed chute contracts vertically from its receiving toward its discharge end, it expands laterally in the same direction so as to deliver the seed cotton in a spread out or disintegrated condition to the action of the rolls hereinabove described. The suction chamber is connected at its farther end to a suction fan 25 by means of a suction pipe 26 of elbow form and leading off from the suction fan 25 is a delivery pipe 27. The casing 28 of the suction chamber is expanded and contracted reversely to the blast chamber and feed chute 21 so as to concentrate the fiber and deliver the same into the suction pipe 26. At the opposite end of the machine is a blast fan 29 from which a pipe 30 leads to the casing 31 in which is arranged a feeder or disintegrator, 32 designating the spout or nozzle leading to the disintegrator casing. Within said casing 31 there is arranged a rotary picker or disintegrator 33 provided with radiating teeth 34 while at one side of the shaft of said rotary picker is arranged a series of stationary disintegrator teeth 35 which alternate with the teeth of the rotary picker. 36 designates a drive pulley on the shaft of said rotary picker by which motion is imparted to the picker. This rotary picker acts to break up or disintegrate the mass of cotton fed into the nozzle 32 and deliver the same to the action of the fan 29 which sucks up the cotton and then blows it through the feed chute.

Arranged under the guard plate 17 is a cotton separating screen 39 of any approved construction to allow cotton-seed to pass while causing the unginned seed to gravitate upon a lower reversely-inclined screen 38 of any approved construction, the screens 39 and 38 being shown in edge view in Fig. 2. A suitable element 37 is placed under the screen 39 to deflect seed upon the lower inclined seat 38.

40 designates a fender. Arranged between the fender 40 and the plate 37 is a suction head 41 from which a return suction flue or pipe 42 leads back into the casing of the fan 29, the object being to return to the fan 29 and to the feed chute 21 any cotton which may possibly escape downward with the seed passing between the teeth of the cotton plate or apron 23. A considerable portion of the air passing between the rolls 1, 4 and 8 is drawn through the entrance space 43 between the upper guard plate 20 and the picker roll 4. Of course, it will be understood that the air also passes from the blast fan 29 to and between the rolls, the current of air passing through the slots or between the teeth in the upper guard plate and the small open space between the end of the guard plate and the cotton roll.

Within the feed chute 21 there are arranged reversely inclined distributing slant rods 44. These rods are arranged in transverse rows, each row being reversely inclined to the rows immediately in advance and in rear thereof and said rows being associated alternately with the top and bottom walls of the feed chute. These rods prevent the cotton from choking the chute and aid in the disintegration and distribution of the seed cotton before it reaches the cotton roll.

The suction of the fan 29 operates to draw the seed cotton through the stationary disintegrating teeth 35 aided by the action of the rotary disintegrator 33, the cotton passing in disintegrated condition to the blast fan 29 which propels the same along the feed chute 21. The seed cotton either strikes the cotton roll direct or slides down the upper guard plate or slides up the delivery or cotton plate to the cotton roll. The rough surface of the cotton roll causes the first cotton to wrap around it and the cotton continues building up upon the roll until it comes in contact with the picker teeth which, in connection with the blast and suction currents act to pick the surplus cotton off. The roll is now covered firmly, and it may be noted at this point that the strand of cotton is approximately equal in strength as compared to a steel strand of the same diameter. The cotton covering the cotton roll acts as an attrition to succeeding cotton and this, in connection with the air current, and the rotary motion of the rolls running the same way at the same peripheral speed, draws the cotton between the rolls, effectively pulling the entire cotton fiber from the seed. The guard plates being close up to the cotton roll prevent the seed from being drawn between the rolls. The picker roll prevents the surplus cotton from adhering to the cotton roll.

The bearing roll forms a tension for the small or cotton roll that has been built up with cotton, and the two rolls running inwardly and reversely to each other at the same peripheral speed, effectually pull the cotton from the seed at the point of contact of the rolls, leaving the seed on the outside of the point of contact or what has been termed the throat. It will be seen that as the bearing roll is running at the same peripheral speed as the small roll, the first cotton having been wrapped around the small roll and taking up the intervening space of 6/1000 of an inch between these two rolls now pulls succeeding cotton between the rolls to the suction chamber. The picker roll is the same distance from the cotton roll as the bearing roll and in view of its peripheral speed being nearly four times as great as that of the cotton roll, it effectually prevents the latter roll from building up more than 6/1000 of an inch.

The principle resembles pulling the cotton from the seed by hand. For instance, suppose that the index finger is the cotton roll and the thumb is the bearing roll; it will be seen that the throat between the finger and thumb is too small to crush the seed, but if each were three inches in diameter for example, they would crush the seed. The cotton roll is about the same diameter of the finger but the bearing roll is much larger than the thumb, consequently enlarging the comparison in size of the throat but not enough to prevent the seed from being drawn in with the cotton. The bearing roll being so much larger than the thumb, acts as a shaft for the transmission of power, said bearing roll being driven by a pulley on one side of the machine and driving the gear on the opposite side. The two rolls coming in close contact with each other will not in themselves satisfactorily pull the cotton off and, hence, the cotton is allowed to build up on the small roll so that it may have the necessary cushioning effect in pulling the cotton from the seed. By lowering the guard plate about one-half an inch and exposing the bearing roll, said roll also acts as an agitator, shaking off the seed that may hang in the throat.

The staple is removed from the seed cotton without breaking the strands or fiber thus preserving the entire and original length of the fiber. The machine dispenses entirely with the use of all saws, knives, hides, steel teeth or carborundum used in other gins. The cotton roll is protected by the cotton wrapped around it so that there is no cost to the operator for repair on this account such as the sharpening of the teeth as in a saw gin, replacing the knives or hides in the roller gin or teeth in other gins. The machine also effects a large saving of horse power by reason of the easy operation thereof. The machine is also exceedingly simple in construction and there is little or no danger in the operation thereof as by getting the hands or fingers caught between the rolls while running. The machine is built entirely of metal, there being no wooden adjustable hair brushes, thus making the machine exceedingly durable.

By reference to Figs. 3 and 4, it will be noted that in order to firmly support the cotton roll 1 at various points in the length thereof, I provide a suitable number of struts or bearings 45. These bearings are connected at their upper ends to upper and lower girths 46 and 47 respectively, the latter being in turn connected at their opposite ends to the end frame pieces or stanchions above referred to. The upper and lower guard plates 20 and 17 and the cotton plate or apron 23 are slotted at the proper intervals to embrace the bearings 45.

Any suitable arrangement of transmission gears may be employed for imparting motion to the rolls 1, 4 and 8, a system of spur gearing being shown at 48 in Fig. 4 for this purpose and being indicated by dotted lines in Fig. 3. One of said rolls, for example the cotton roll 1 may be provided with a drive pulley 49, motion being primarily imparted to the cotton roll and from thence through the transmission gears to the picker roll and bearing roll.

I claim:—

1. A pneumatic cotton gin comprising an air chamber, means for causing a current of air to traverse said chamber, a rotary cotton pulling roll provided with teeth acting to wrap the cotton around said roll, a bearing roll arranged close up to but out of contact with the cotton roll, and adjustable toward and away from the cotton roll, a picker roll, and a cotton plate or apron having teeth arranged close to the cotton roll.

2. A pneumatic cotton gin comprising an air chamber, means for causing a current of air to traverse said chamber, a rotary cotton pulling roll located within the air chamber and provided with teeth acting to wrap the cotton around said roll, means coöperating with said roll to remove the cotton from the seed, and a picker roll coöperating with the cotton roll.

3. A pneumatic cotton gin comprising an air chamber, means for causing a current of air to traverse said chamber, a rotary cotton pulling roll located in the path of the blast and provided with teeth which grip the cotton and wrap the same around said roll, a bearing roll at one side of the cotton roll, and a picker roll at the opposite side of the cotton roll, all of said rolls being arranged within the air chamber and out of contact with one another.

4. A pneumatic cotton gin comprising an air chamber, means for causing a current of air to traverse said chamber, a rotary cotton pulling roll located within the air chamber and provided with teeth acting to wrap the cotton around said roll, a picker roll coöperating with the cotton roll, means coöperating with said roll to remove the cotton from the seed, and means for adjusting the picker roll toward and away from the cotton roll.

5. A pneumatic cotton gin comprising an air chamber, means for causing a current of air to traverse said chamber, a rotary cotton pulling roll arranged in said air chamber and provided with teeth acting to wrap the cotton around said roll, a bearing roll underlying the cotton roll and arranged out of contact with said cotton roll, a picker roll, and guard plates in said chamber converging toward the cotton roll and located in advance of the bearing roll.

6. A pneumatic cotton gin comprising an air chamber, means for causing a current of air to traverse said chamber, a rotary cotton pulling roll arranged in said chamber and provided with a roughened surface acting to cause the cotton to wrap itself around said roll, a fluted bearing roll underlying the cotton roll and out of contact therewith, a picker roll, and guard plates in said chamber converging toward the cotton roll and located in advance of the cotton roll.

7. A pneumatic cotton gin comprising an air chamber, means for causing a current of air to traverse said chamber, converging guard plates arranged in said chamber, a rotary cotton roll located at the point of convergence of the guard plates and provided with a roughened surface acting to cause the cotton to wrap itself around said roll, a picker roll coöperating with the cotton roll, a bearing roll underlying the cotton roll, and means for adjusting the picker and bearing roll toward and away from the cotton roll.

8. A pneumatic cotton gin comprising an air chamber, means for causing a current of air to traverse said chamber, converging guard plates arranged in said chamber, a rotary cotton pulling roll located at the point of convergence of the guard plates but out of contact therewith and provided with a roughened surface acting to cause the cotton to wrap itself around said roll, a bearing roll underlying the cotton roll, a picker roll and a seed deflecting guard plate extending in front of the bearing roll and interposed between the guard plates with its edge close up to the periphery of the cotton roll.

9. A pneumatic cotton gin comprising an air chamber, means for causing a current of air to traverse said chamber, a rotary cotton pulling roll located within the air chamber and provided with teeth acting to wrap the cotton around said roll, a seed deflecting guard plate, a picker roll, means coöperating with said roll to remove the cotton from the seed, and a cotton plate or apron, the guard plate and the cotton plate being provided with teeth which terminate close to the top and bottom of the cotton roll.

10. A pneumatic cotton gin comprising an air chamber, means for causing a current of air to traverse said chamber, a rotary cotton pulling roll provided with teeth acting to wrap the cotton around said roll, a picker roll, a bearing roll, the last named rolls being arranged at opposite sides of and out of contact with the cotton roll and contained within the air chamber, and transmission gearing for causing simultaneous rotation of all of said rolls.

11. A pneumatic cotton gin comprising an air chamber, means for causing a current of air to traverse said chamber, a picker roll a bearing roll, and a rotary cotton pulling and wrapping roll having the surface thereof formed with V-shaped longitudinal grooves and circumferential grooves intersecting said V-shaped grooves forming intersecting rows of teeth having undercut faces which grip the cotton and wrap the same around the cotton roll and in conjunction with the bearing roll pull the cotton off the seed.

In testimony whereof I affix my signature in presence of two witnesses.

JOHN J. McNALLY.

Witnesses:
HERBERT M. FISH,
WM. H. OVERTON, Jr.

Copies of this patent may be obtained for five cents each, by addressing the "Commissioner of Patents, Washington, D. C."